No. 867,831. PATENTED OCT. 8, 1907.
L. NATHAN.
PROCESS FOR STERILIZING CLOSED VESSELS.
APPLICATION FILED JUNE 28, 1907.
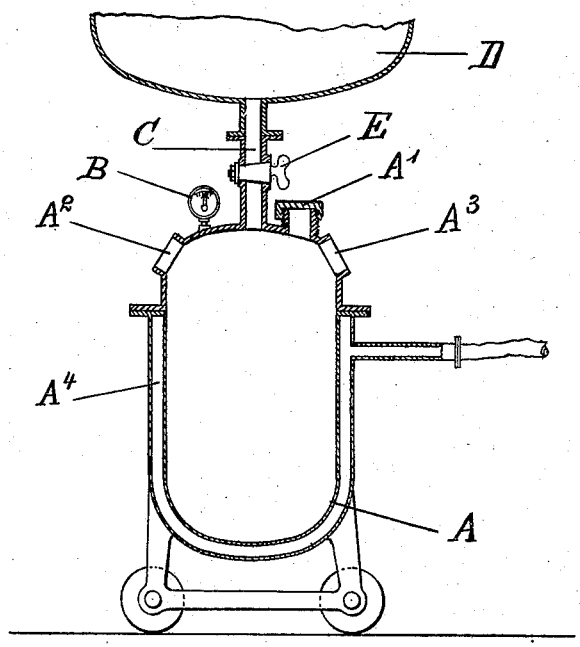
WITNESSES
INVENTOR
Leopold Nathan
BY
ATTORNEYS

UNITED STATES PATENT OFFICE.

LEOPOLD NATHAN, OF ZURICH, SWITZERLAND.

PROCESS FOR STERILIZING CLOSED VESSELS.

No. 867,831.  Specification of Letters Patent.  Patented Oct. 8, 1907.

Application filed June 28, 1907. Serial No. 381,248.

*To all whom it may concern:*

Be it known that I, LEOPOLD NATHAN, chemist, and a resident of Zurich, 104 Ausstellungsstrasse, Switzerland, have invented new and useful Improvements in Processes for Sterilizing Closed Vessels, of which the following is a specification.

My invention relates to the sterilizing of closed vessels and particularly such very large vessels as are used in fermenting processes, for instance in the manufacture of beer and those which have sterilized so far by steam.

The object of my invention is to effect a thorough sterilization at a relatively low cost in a short time, by simple means, and to avoid temperatures which might lead to the cracking of vessels made of glass or other material highly sensitive to heat. This result I secure by the employment of alcohol vapors in the particular novel manner hereinafter set forth, which involves the filling of a closed receptacle with alcohol vapors while the receptacle is cool or at a normal temperature. Thus the vapors will become condensed on the walls of the receptacle and the condensed liquid will flow down such walls, to be collected and used again after purification if desired. Alcohol having a much lower boiling point and acting in a much shorter time than the steam which has been used heretofore in sterilizing large vessels, it follows that the new sterilizing treatment heats the receptacle much less. The dissolving action of alcohol on resins formed in the manufacture of beer is another favorable factor, as is also the fact that traces of alcohol remaining at the end of the sterilizing treatment will not injuriously affect the subsequent fermentation process as other chemical compounds used in sterilization do.

An apparatus suitable for carrying out my present invention is shown in the accompanying drawing in vertical section.

A designates an iron or copper still or boiler into which alcohol may be filled through an opening normally closed by a screw cap A'.

B is a pressure gage, and C a pipe for conveying the alcohol vapors to the vessel D to be sterilized. This vessel is closed to the atmosphere, so that it will not receive any new supply of air during the sterilizing process. A cock or valve E controls the admission of alcohol vapors to the vessel D. The walls of said vessel are generally smooth, so that the condensed liquid may flow down readily on them and collect at the bottom, whence it may be returned to the boiler A through a pipe F, controlled by a cock or valve F'. In order that the evaporation of the alcohol may be observed, the boiler is provided with a transparent pane or sight or preferably two of them are provided as at $A^2$, $A^3$, one for admitting light and the other to look through. The pipe C may lead to any suitable part of the vessel D, preferably to the bottom thereof, as shown.

The operation is as follows: The alcohol is heated in any suitable manner, as by introducing steam into a jacket $A^4$ surrounding the boiler A, the valve E being closed at first. When the gage B indicates a pressure of about half an atmosphere above atmospheric pressure, the valve E is opened thus allowing the vapors to rush into the vessel D, which they fill uniformly, thus sterilizing not only the walls of the vessel but the air contained in it. The heating of the boiler is discontinued as soon as observation shows that all the alcohol has been vaporized. The condensed liquid flows down the walls and collects at the bottom, returning to the boiler through the pipe F. The valve E is left open.

Ten or fifteen minutes is sufficient to thoroughly sterilize even very large vessels. The amount of alcohol required is very small, and if the condensed product is returned to the boiler, the loss is slight. The boiler may be removed a half hour after the end of the heating.

A particular advantage of the procedure above described is that the vessel which originally has the temperature of the surrounding air, is heated but slightly by the alcohol vapors (owing to their low specific heat) so that I need not go to the trouble and expense of cooling the vessel after sterilization in order to bring it to a proper temperature for the fermentation process. Another advantage of alcohol as a sterilizing agent is that any traces of it remaining in the vessel will of course have no detrimental effect in cases where the vessel is used subsequently for the manufacture of beer, wine or other alcoholic beverages. Alcohol is also a solvent for resins, a by-product formed in some fermenting processes, and this sterilizing agent offers peculiar and great advantages for the cleaning of vessels used in fermenting processes.

The sterilizing properties of alcohol in liquid or gaseous form are well-known; but my improved process, in which the supply of air is excluded from the vessel under treatment, enables me to take advantage of these properties on a commercial scale, which so far as I know has been impossible hitherto. Some moisture is always present, partly mixed with the alcohol, partly remaining in the vessel from previous fermenting operations.

Now what I claim and desire to secure by Letters Patent is the following:

1. The process of sterilizing vessels, which consists in heating and vaporizing alcohol in a confined space so as to create a pressure above atmospheric pressure thereupon releasing the confined vapors and passing them into the vessel to be sterilized, said vessel being closed against the outside air, and allowing the vapors to become condensed and to flow down on the walls of the vessel.

2. The process of sterilizing vessels, which consists in heating and partially vaporizing alcohol in a confined space so as to create a pressure above atmospheric pressure, thereupon releasing the confined vapors and passing them into the vessel to be sterilized and continuing to heat until all the alcohol has been vaporized, and then discontinuing the application of heat and allowing the vapors to become condensed on the walls of the vessel.

In testimony, that I claim the foregoing as my invention, I have signed my name in presence of two witnesses, this 17th day of June, 1907.

LEOPOLD NATHAN.

Witnesses:
 ANNA GROSS,
 A. LIEBERKNECHT.